United States Patent [19]
Colucci et al.

[11] Patent Number: 5,306,513
[45] Date of Patent: Apr. 26, 1994

[54] CONES FORMED FROM ROLL DOUGH

[76] Inventors: Joyce Colucci, 1 Connel Dr., West Orange, N.J. 07052; William A. May, 14 Mockingbird Dr., Hackettstown, N.J. 07840

[21] Appl. No.: 793,505

[22] Filed: Nov. 15, 1991

Related U.S. Application Data

[63] Continuation of Ser. No. 402,786, Sep. 5, 1989, abandoned, which is a continuation-in-part of Ser. No. 922,675, Oct. 24, 1986, abandoned.

[51] Int. Cl.$^5$ ............................................. A21D 13/08
[52] U.S. Cl. ..................... 426/139; 426/138; 426/280; 426/390; 426/499; 426/556
[58] Field of Search ............... 426/138, 139, 280, 390, 426/556, 499

[56] References Cited

U.S. PATENT DOCUMENTS

| | | | |
|---|---|---|---|
| 3,410,691 | 11/1968 | Stanley | 426/138 |
| 3,431,869 | 3/1969 | Frank | 426/290 |
| 4,303,690 | 12/1981 | Haas, Sr. et al. | 426/499 |
| 4,624,856 | 11/1986 | Vanderveer et al. | 426/549 |
| 4,717,577 | 1/1988 | Constance et al. | 426/549 |
| 4,795,652 | 1/1989 | Cooper | 426/138 |
| 4,812,323 | 3/1989 | Savage | 426/549 |

Primary Examiner—Donald E. Czaja
Assistant Examiner—Mary S. Mims
Attorney, Agent, or Firm—Staas & Halsey

[57] ABSTRACT

A baked edible cone which has a water content of from about 3.0 wt. % to about 10.0 wt. %, and which has the appearance, texture, taste, and consistency of a cookie. The cone may contain an effective water-binding or water-retaining amount of a water-binding agent, or may be refrigerated prior to baking to achieve retention of water within the cone. A preferred water-binding agent is hydrolyzed casein.

3 Claims, 2 Drawing Sheets

CONES FORMED FROM ROLL DOUGH

This application is a continuation-in-part of application Ser. No. 922,675, filed Oct. 24, 1986 and a file wrapper continuation of application Ser. No. 402,786 filed Sep. 5, 1989 now abandoned.

This invention relates to the formation of edible cones, more particularly cookie cones, from a roll dough composition. More particularly, the invention relates to edible cones having sufficient moisture or water content when baked such that the edible cones have the texture, appearance, and consistency of a cookie.

Most cones known in the art are made from a composition that results in what is known in the art as a wafer. Such cones are formed inside of or baked inside of a cone form. Upon baking however, water is evaporated, or driven off from the cone such that the resulting cone has a reduced moisture or water content. Such cones do not have the appearance, taste, texture, and consistency of cookies.

It is therefore an object of the present invention to provide a baked cone having the appearance, texture, taste, and consistency of a cookie. Such an object is achieved by making a roll dough or by modifying standard batters such as cake batters or drop cookie batters, such that said roll dough or said batters have sufficient moisture or water content retained in said roll dough or modified batters so as to provide a baked cone having the appearance, texture, taste, and consistency of a cookie.

In accordance with an aspect of the present invention, there is provided a product which comprises an edible cone having the texture, appearance, taste, and consistency of a cookie. The cone is comprised of a wrapped piece and has been formed from a roll dough composition which provides a baked cone having a water content of from about 3.0 wt. % to about 10.0 wt. %. Such a roll dough composition provides a baked cone having the texture, appearance, and consistency of a cookie. In one embodiment, the roll dough composition includes a water-binding or water-retaining agent in an amount effective to maintain a water content of the baked cone of from about 3.0 wt. % to about 10.0 wt. %.

Water-binding agents which may be employed within the scope of the present invention include proteins such as hydrolyzed casein (a milk protein), gelatin, and soy protein; plant extracts such as pectin, carob gum, alginates, agar, and carrageenan; animal extracts such as xanthan gum; and modified starches such as dextran, and carboxy methylcellulose. A preferred water-binding agent is hydrolyzed casein.

Although the scope of this embodiment of the present invention is not to be limited by any theoretical reasoning, it is believed that the water-binding agent binds to the water contained in the roll dough composition in order to enable a sufficient amount of water to be retained in the roll dough composition during baking of the roll dough, thereby preventing evaporation of an excessive amount of water during baking of the roll dough. In this manner, the water content of the roll dough remains at a level whereby the roll dough retains the appearance, taste, texture, and consistency of a cookie after baking thereof. In addition, the retained water enables the dough to remain pliable during the cone-forming and baking process.

In a preferred embodiment, the water-binding agent is present in an amount of from about 0.5 wt. % to about 2.5 wt. %, most preferably at about 0.75%.

The water content of the baked cone preferably is from about 3.0 wt. % to about 5.0 wt. %, most preferably from about 3.0 wt. % to about 4.0 wt. %.

The amount of water present in the roll dough prior to baking thereof is sufficient to provide a baked cone having a water content of from about 3.0 wt. % to about 10.0 wt. %. Preferably, the water content of the roll dough prior to baking is from about 6.0 wt. % to about 20.0 wt. %.

Another method or process whereby water is retained in the baked cone is to cool (for example, by refrigeration) the roll dough in order to retain water in the baked cone thereby. The process comprises making a roll dough composition having a water content sufficient to provide a baked cone having a water content of from about 3.0 wt. % to about 10.0 wt. %, and having the texture, appearance, and consistency of a cookie. The roll dough composition is then cooled, and then is cut into pieces capable of being formed into cones. The pieces are then formed into cones, which are then refrigerated. The cones then are heated to effect baking of the dough, thereby making a baked cone having a water content of from about 3.0 wt. % to about 10.0 wt. %. The cone also has the texture, appearance, and consistency of a cookie.

In one embodiment, the roll dough composition, having a water content as hereinabove described, is cooled by refrigeration before being formed into cones. The refrigeration, whether before or after the cone-forming step, may be carried out at a temperature of from about 34° F. to about 40° F., preferably at about 38° F. After refrigeration, the dough is rolled to a desired thickness, and then cut with a triangular shaped cutter. The cut pieces are then wrapped or formed around the outside of cone forms. The cones, now supported by the cone forms, are refrigerated, preferably at temperatures as hereinabove described. A preferred refrigeration time is about 30 minutes. After refrigeration the forms are placed on holders of a baking tray and heated to effect baking of the cones. The cones are preferably baked at temperatures of at least about 300° F., most preferably at about 350° F. After baking, cones having a water content of from about 3.0 wt. % to about 10.0 wt. %, and having the appearance, texture, and consistency of cookies are provided.

Although the scope of this process is not intended to be limited to any theoretical reasoning, it is believed that the cooling and/or refrigeration may enable certain ingredients in the roll dough (e.g., flour) to bind to the water, thereby enabling the water to be retained by and preventing the evaporation of water from the roll dough during baking.

The baked cone may, in a preferred embodiment, have a water content of from about 3.0 wt. % to about 5.0 wt. %, most preferably from about 3.0 wt. % to about 4.0%.

In other embodiments, the roll dough composition may be made by modifying a drop cookie batter, a standard cake batter, or other batters and doughs known to those skilled in the art.

The term "roll dough", as used herein, means a standard roll dough composition to which a water-binding agent may or may not have been added, or a drop cookie, cake, or other type of batter or dough which has been modified so as to have a roll dough consistency.

Ingredients which may be included in such compositions include, but are not limited to, solid ingredients such as flour; baking soda; eggs; salt; baking powder; powdered egg whites; powdered milk; cane sugar; brown sugar; vanilla powder; and lecithin powder; and, in addition to water, liquid ingredients such as hydrogenated vegetable oil; liquid vanilla flavoring; and liquid butter flavoring; and meltable ingredients such as butter; margarine; shortening; and chocolate chips. The scope of the present invention, however, is not to be limited to such liquid and solid ingredients. The exact ingredients of the roll dough compositions of the present invention may vary as long as the water content after baking remains within the scope of the present invention.

It is also to be understood that the water content of the roll dough composition may be provided by pure water (i.e., tap, distilled, or spring water, etc.) and by water provided in certain meltable or liquid ingredients. For example, butter and margarine may have a water content of about 50 wt. %, chocolate chips or flakes may have a water content of about 25 wt. %, and shortening may have a water content of about 10 wt. %.

Batters such as cake batters, or drop cookie batters may be modified into roll dough compositions which have become pliable (i.e., such compositions may be shaped or formed into cones). By either (i) adding a water-binding agent to the compositions; or (ii) cooling the compositions before cone formation and refrigerating the compositions after cone formation, one enables the water to be retained in such compositions during baking such that the water content after baking is from about 3.0 wt. % to about 10.0 wt. %. It is also to be noted that, when a water-binding agent is employed, cooling and/or refrigeration of the composition or of the cones is not required; however, cooling and/or refrigeration of the composition or of the cones containing the water-binding agent may be carried out if desired. Such compositions may be immediately formed into cones, and the cones may be baked immediately after they are formed, preferably as hereinabove described.

The term "water content" as used herein means the water content after baking. Such water content may be determined by the Karl Fischer Titrimetric Method or the Toluene Distillation Method as described in the *Food Chemical Codex*, published by the National Academy of Sciences Press, pgs. 552-554, the contents of which are hereby incorporated by reference.

The term "initial water content" as used herein means the water content of the composition as calculated prior to baking of the composition. Such content is determined through measuring the initial amount of pure water in the composition, as well as calculating the amount of water in water-containing ingredients (e.g., margarine, butter, chocolate chips, shortening, etc.).

In calculating initial water content, the approximate amount of water present in margarine or butter is determined by multiplying the weight of the margarine or butter by 0.50. The approximate amount of water present in chocolate chips or flakes is determined by multiplying the weight of the chocolate chips or flakes by 0.25. The approximate amount of water present in shortening is determined by multiplying the weight of the shortening by 0.10.

The invention will now be described with respect to the following drawings, wherein.

Figure 2:
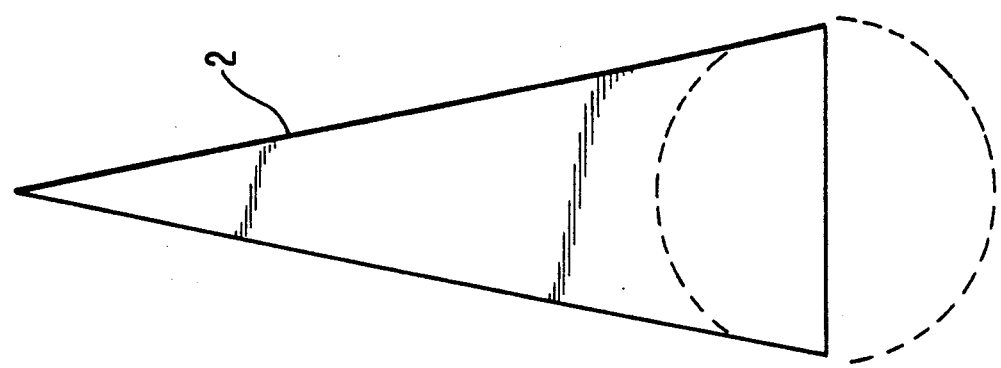
FIG. 2 is a plan view of a cone form around which the roll dough is formed.

The invention will now be described with respect to the following examples; however, the scope of the present invention is not to be limited thereby.

EXAMPLE 1

A drop cookie batter was modified to provide the following compositions:
- ¼ cup margarine (1 oz.)
- ⅛ cup water (1 oz.)
- 1 tsp. vanilla (0.18 oz.)
- ¼ cup cane sugar (1.75 oz.)
- ¼ cup brown sugar (1.75 oz.)
- 1¼ cups brown sugar (1.75 oz.)
- ½ tsp. salt (0.12 oz.)
- ½ tsp. baking soda (0.12 oz.)
- 1 egg white (1 oz.)

This composition has an initial water content of approximately 10.4 wt. %.

EXAMPLE 2

A cake batter (brownie) recipe was modified to a roll dough of the following composition:
- ¼ cup margarine (2 oz.)
- ½ cup cane sugar (3.50 oz.)
- 1 tsp. vanilla (0.18 oz.)
- 2 tbsp. water (0.67 oz.)
- 1 cup melted chocolate chips (4 oz.)
- 2 cups flour (12 oz.)
- ¼ tsp. baking soda (0.06 oz.)
- ¼ tsp. salt (0.06 oz.)
- 2 egg whites (2 oz.)

This composition has an initial water content of approximately 10.9 wt. %. Garnish such as shaved chocolate chunks also may be added to this roll dough composition. It is to be understood that such garnish is not figured into the calculation of the water content of the dough after baking.

EXAMPLE 3

Another cookie roll dough was made of the following composition:
- 1 cup sugar (7 oz.)
- ½ cup margarine or butter (4 oz.)
- ¼ cup shortening (2 oz.)
- 1 tsp. vanilla (0.18 oz.)
- 2 eggs (4 oz.)
- 2¼ cups flour (15 oz.)
- 1 tsp. baking powder (0.24 oz.)
- ¾ tsp. salt (0.18 oz.)

This composition has an initial water content of approximately 6.7 wt. %. Garnish may also be added to this roll dough.

EXAMPLE 4

This is another modification of a drop cookie batter used to make the edible cones of the present invention:
- 1¼ cups flour (7.50 oz.)
- ½ cup salt (0.12 oz.)
- ½ tsp. baking soda (0.12 oz.)
- 1 egg white (1 oz.)

¼ cup margarine (2 oz.)
⅜ cup cane sugar (2.63 oz.)
⅜ cup brown sugar (2.62 oz.)
1 tsp. vanilla (0.18 oz.)

This composition has an initial water content of approximately 6.2 wt. %.

EXAMPLE 5

This is another modification of a drop cookie batter, which is as follows:

1⅜ cups flour (11.25 oz.)
½ tsp. salt (0.12 oz.)
½ tsp. baking soda (0.12 oz.)
1 egg white (1 oz.)
⅛ cup margarine (1 oz.)
⅛ cup water (1 oz.)
¼ cup cane sugar (1.75 oz.)
¼ cup brown sugar (1.75 oz.)
1 tsp. vanilla (0.18 oz.)

This composition has an initial water content of approximately 8.3 wt. %.

EXAMPLE 6

Another modification of the cake batter was made of the following composition:

1⅜ cups flour (9.75 oz.)
¼ tsp. baking soda (0.06 oz.)
¼ tsp. salt (0.06 oz.)
2 egg whites (2 oz.)
¼ cup margarine (2 oz.)
½ cup sugar (3.50 oz.)
1 tsp. vanilla (0.18 oz.)
2 tsp. water (0.67 oz.)
1 cup melted chocolate chips (4 oz.)

This composition has an initial water content of approximately 12.0 wt. %.

EXAMPLE 7

The cake batter was again modified to provide the following composition:

2½ cups flour (15 oz.)
¼ tsp. baking soda (0.06 oz.)
¼ tsp. salt (0.06 oz.)
2 egg whites (2 oz.)
¼ cup margarine (2 oz.)
½ cup sugar (3.50 oz.)
1 tsp. vanilla (0.18 oz.)
2 tbsp. water (0.67 oz.)
1 cup melted chocolate chips (4 oz.)

This composition has an initial water content of approximately 9.7 wt. %.

EXAMPLE 8

A roll dough composition was prepared as follows:

| Ingredient | Amount |
| --- | --- |
| flour | 7.50 oz. |
| baking soda | .12 oz. |
| salt | .12 oz. |
| powdered egg white | 1.00 oz. |
| margarine | 1.00 oz. |
| water | 1.00 oz. |
| brown sugar | 3.50 oz. |
| liquid vanilla extract | .18 oz. |
| chocolate chips | 2.00 oz. |

This roll dough composition has an initial water content of approximately 12.2 wt. % before baking. After baking, this composition has a water content of about 4.8 wt. %.

Figure 1:
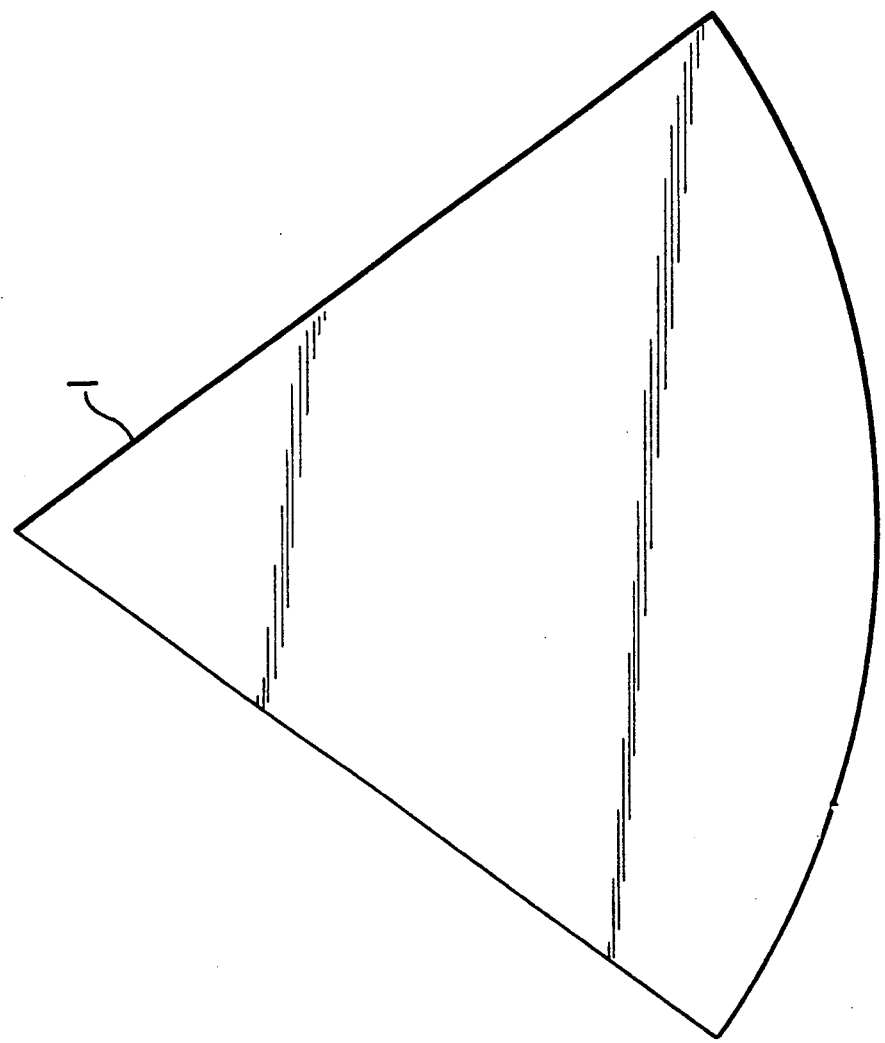
FIG. 1 is a top view of a cutter of the roll dough composition.
Figure 3:
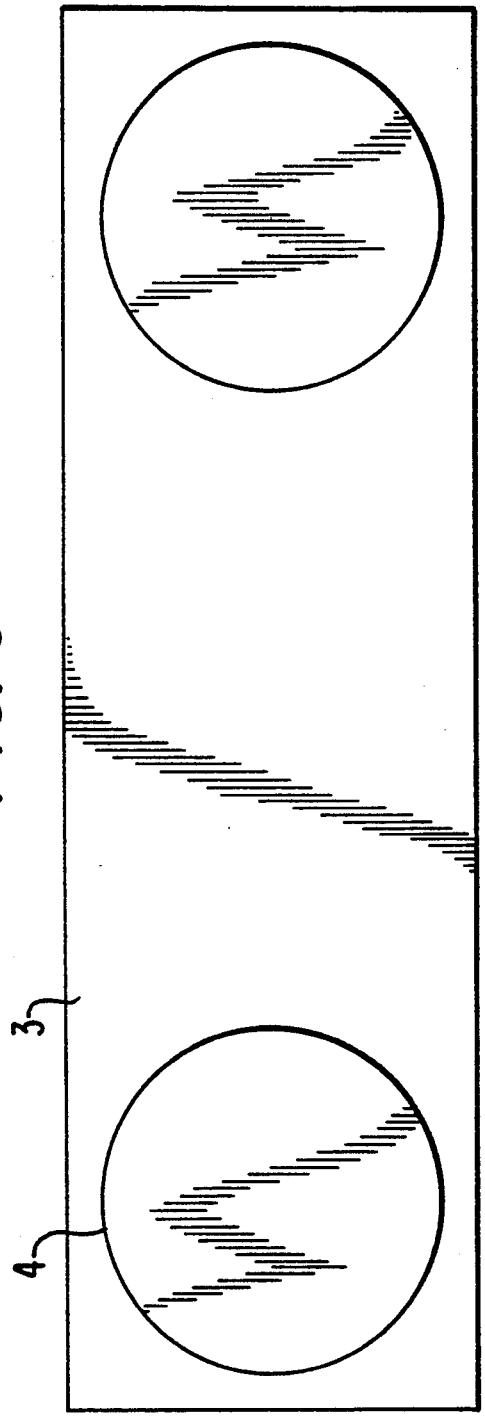
FIG. 3 is a top view of a baking tray with holders for the cone forms.
Figure 4:
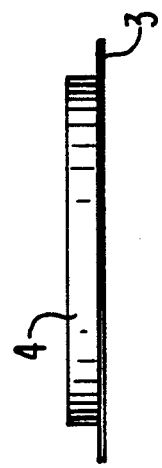
FIG. 4 is a side view of a cone holder of the baking tray shown in FIG. 3.

The roll dough compositions of each of Examples 1 to 8 were refrigerated at about 38° F. for 1 hour. Each of these compositions was then rolled out to a ⅛ inch thickness. Then the compositions were cut into triangular shaped pieces with cutter 1 shown in FIG. 1. In these examples, cutter 1 is 5⅞ inches long at its longest point, 5⅝ inches long at its widest point, and 5¾ inches long at the bases of the "triangle". The pieces of dough are then wrapped around the cone form 2 in FIG. 2. In these examples, the cone form is 4½ inches long on the incline and 1¾ inches wide at the base. The pieces are then hand formed around the cone. The roll dough cones are then left on the cone forms and placed in a refrigerator for ½ hour at about 38° F. The forms supporting the roll dough cones were then removed from the refrigerator and placed on holders 4 on tray 3 shown in FIGS. 3 and 4. In these examples the holders are circular projections ¼ inch high and 1 11/16 inches in diameter. The tray holding the forms and the cones is then placed in an oven and the cones are baked at 350° F. for 15 minutes. The tray is then removed from the oven and is allowed to cool enough so that one can remove the cones from the forms. The cones are then allowed to cool completely and are then ready to be consumed.

EXAMPLE 9

A roll dough composition containing a water-binding agent (hydrolyzed casein) was prepared as follows:

| Ingredient | Amount (grams) |
| --- | --- |
| hydrogenated vegetable oil (M.P. = 106° C.) | 5.00 |
| water | 22.00 |
| powdered egg white | 4.00 |
| non-fat dry milk solids | 15.00 |
| liquid vanilla extract | 5.00 |
| vanilla powder | 3.00 |
| butter flavoring | 0.10 |
| crystallized brown sugar | 58.00 |
| salt | 1.50 |
| baking soda | 2.00 |
| lecithin (emulsifier) | 2.50 |
| high gluten flour | 100.00 |
| chocolate chips | 50.00 |
| hydrolyzed casein | 2.00 |

This roll dough composition has an initial water content of approximately 12.8 wt. %. After baking, this composition had a water content of about 3.8 wt. %.

EXAMPLE 10

Another roll dough composition containing hydrolized casein as a water-binding agent was prepared as follows:

| Ingredient | Amount (grams) |
| --- | --- |
| hydrogenated vegetable oil | 25 |
| water | 110 |
| powdered egg white | 20 |
| liquid vanilla extract | 25 |
| powdered non-fat dry milk | 75 |
| butter flavoring | 0.50 |
| brown sugar | 290 |
| vanilla powder | 15 |
| salt | 7.50 |
| baking soda | 10 |
| lecithin | 12.50 |

| Ingredient | Amount (grams) |
| --- | --- |
| hydrolyzed caseinate | 7.50 |
| high gluten flour | 500 |
| chocolate flakes | 250 |

This composition has an initial water content of approximately 12.3 wt. %.

This formula may be used to make 20 cones. When high humidity conditions are present, this formula may be modified whereby 120 grams of water and 25 grams of vanilla powder are added, and the liquid vanilla extract is omitted.

The formula in Examples 9 and 10, due to the presence of an effective water-binding amount of a water-binding agent, may be formed into cones, as hereinabove described, without a prior cooling step, and the cones may be baked, preferably under conditions hereinabove described, without a prior refrigeration step. Also, the use of hydrogenated vegetable oil, having a melting point of 106° C. as opposed to 75° C. for margarine, aids in preventing "running" of fats and/or oils from the roll dough, thus facilitating the formation of the dough into a cone.

It is to be understood that the scope of the invention is not to be limited to the specific examples and embodiments described above. Any roll dough composition, whether a presently existing roll dough composition or a composition made as a result of modifying a drop cookie, cake, or other batter or dough, may be used as long as the solid to liquid weight ratio is within the range disclosed in this specification. The size of the cutter as well as the cone forms and form holders may also be changed within the scope of the invention. The refrigeration and heating times and temperatures also are not limited to the specific examples. The invention may be practiced other than as particularly described and still be within the scope of the accompanying claims.

What is claimed is:

1. A process for making a cookie cone from a roll dough composition, said roll dough composition having a moisture content sufficient to provide a baked cone having the texture, appearance and consistency of a cookie, said baked cone having a water content of from about 3.0 wt. % to about 10 wt. %, said process comprising the following steps:
    cooling said roll dough composition;
    shaping said roll dough composition about the exterior of a cone form to provide a shaped cone;
    refrigerating said shaped cone; and
    heating said shaped cone supported solely by said cone form and free of external support to effect baking of the dough into a cookie cone.

2. A process for making a cookie cone from a roll dough composition, said roll dough composition having a moisture content sufficient to provide a baked cone having the texture, appearance and consistency of a cookie, said baked cone having a water content of from about 3.0 wt. % to about 10 wt. %, said process comprising the following steps:
    adding a water-binding agent to said roll dough composition, said amount of water-binding agent being added to said roll-dough composition in an amount from about 0.5 wt. % to about 2.5 wt. %;
    shaping said roll dough composition about the exterior of a cone form to provide a shaped cone; and
    heating said shaped cone supported solely by said cone form and free of external support to effect baking of the dough into a cookie cone.

3. A process as in claim 2, wherein said water-binding agent is selected from the class consisting of hydrolyzed cesein, pectin, carob gum, alginates, agar, carrageenan, soy protein, gelatin, xantham gum, carboxy methylcellulose and dextran.

* * * * *